(12) United States Patent
Kuster et al.

(10) Patent No.: US 11,853,086 B1
(45) Date of Patent: Dec. 26, 2023

(54) WATER DELIVERY SYSTEM

(71) Applicants: Hans L. Kuster, Barrington, RI (US); Michael McNamara, Coventry, RI (US); Michael Ferruccio, Warwick, RI (US)

(72) Inventors: Hans L. Kuster, Barrington, RI (US); Michael McNamara, Coventry, RI (US); Michael Ferruccio, Warwick, RI (US)

(73) Assignee: AquaMotion, Inc., Barrington, RI (US)

( * ) Notice: Subject to any disclaimer, the term of this patent is extended or adjusted under 35 U.S.C. 154(b) by 0 days.

(21) Appl. No.: 18/210,898

(22) Filed: Jun. 16, 2023

Related U.S. Application Data

(63) Continuation-in-part of application No. 17/894,523, filed on Aug. 24, 2022.

(60) Provisional application No. 63/285,634, filed on Dec. 3, 2021, provisional application No. 63/241,679, filed on Sep. 8, 2021.

(51) Int. Cl.
*F24D 17/00* (2022.01)
*G05D 23/02* (2006.01)

(52) U.S. Cl.
CPC ........ *G05D 23/025* (2013.01); *F24D 17/0078* (2013.01); *F24D 2220/0257* (2013.01); *Y10T 137/6497* (2015.04)

(58) Field of Classification Search
CPC ......... F24D 17/0078; F24D 2220/0257; E03C 2201/60; Y10T 137/6497; G05D 23/022; G05D 23/025
See application file for complete search history.

(56) References Cited

U.S. PATENT DOCUMENTS

| | | |
|---|---|---|
| 5,205,318 A | 4/1993 | Massaro |
| 6,536,464 B1 | 3/2003 | Lum |
| 7,874,498 B2 | 1/2011 | Kempf |
| 8,083,500 B1 | 12/2011 | Lebkuchner et al. |
| 8,303,184 B1 | 11/2012 | Lebkuchner et al. |
| 8,613,396 B1 * | 12/2013 | Anderson ............ G05D 23/022 236/100 |
| 9,328,736 B2 | 5/2016 | Lebkuchner et al. |
| 9,863,647 B1 | 1/2018 | McNamara et al. |
| 10,107,408 B2 | 10/2018 | Dulin |
| D834,145 S | 11/2018 | McNamara et al. |
| 10,612,793 B1 | 4/2020 | Kuster et al. |
| 11,078,651 B2 | 8/2021 | Kim |
| 11,193,605 B1 | 12/2021 | Kuster et al. |

(Continued)

*Primary Examiner* — Kevin F Murphy
(74) *Attorney, Agent, or Firm* — Salter & Michaelson

(57) ABSTRACT

A system for controlling water delivery throughout a household water delivery network that includes bathroom and kitchen sinks, as well as other equipment for dispensing water, said system including a controller disposed at a site, the temperature of the water of which is to be controlled; said controller including a temperature probe for detecting the water temperature at the site; a pump for circulating water from a water heater to the site; and a wireless communication network that interconnects the controller with the pump in order to control hot water delivered from the water heater based on sensed temperature at the temperature probe. Also a process for controlling the water temperature of a water delivery system that includes a pump, either via a wifi hub or a system APP. Also disclosed is a novel adjustment ring associated with the valve.

12 Claims, 11 Drawing Sheets

(56) References Cited

U.S. PATENT DOCUMENTS

| | | |
|---|---|---|
| D949,927 S | 4/2022 | Kuster et al. |
| D960,202 S | 8/2022 | Kuster et al. |
| D975,748 S | 1/2023 | Kuster et al. |
| D975,749 S | 1/2023 | Kuster et al. |
| D975,750 S | 1/2023 | Kuster et al. |

* cited by examiner

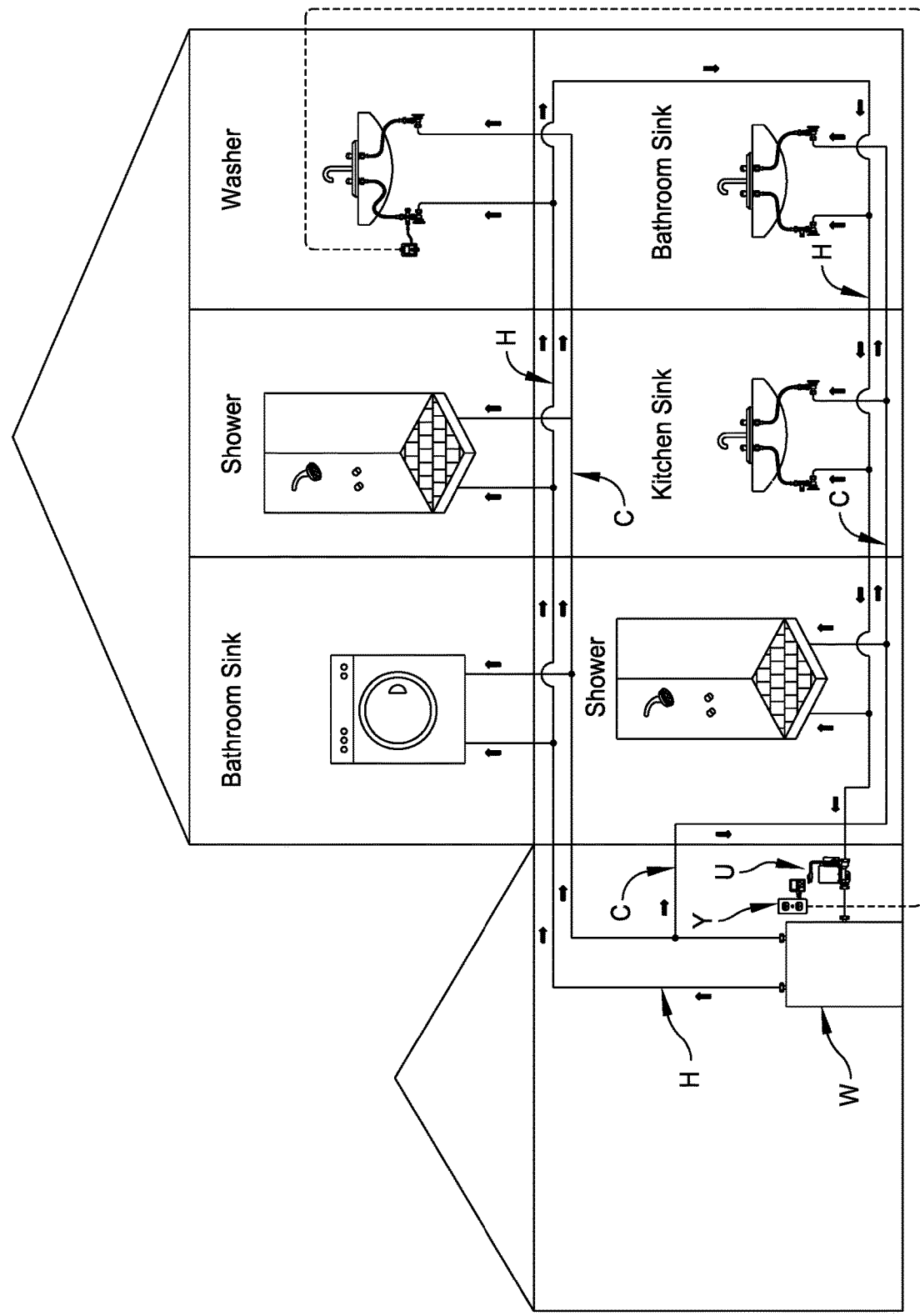

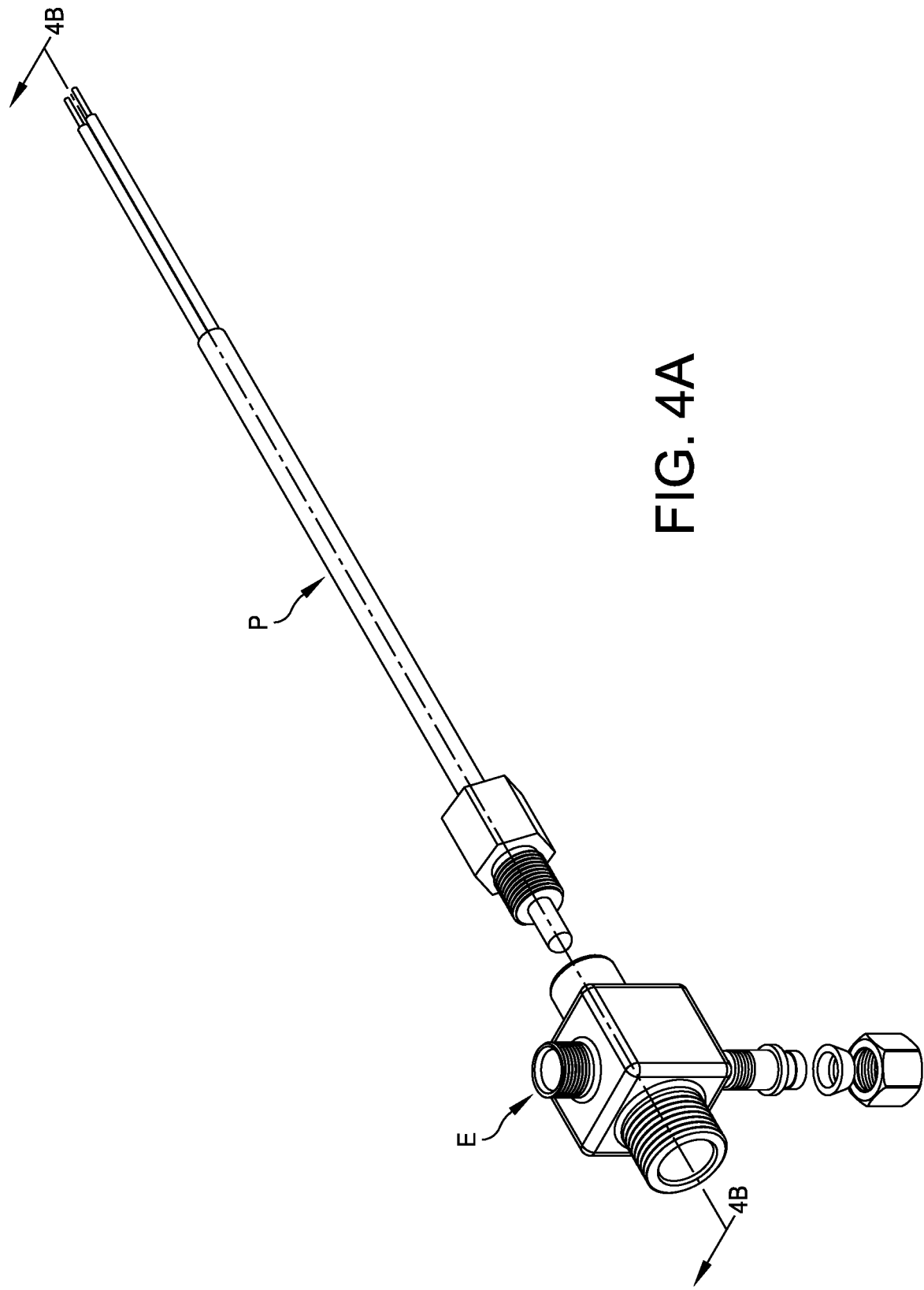

WATER DELIVERY SYSTEM

RELATED CASES

This application is a continuation-in-part (CIP) of U.S. Ser. No. 17/894,523 filed on Aug. 24, 2022. We hereby incorporate by reference U.S. Pat. No. 9,863,647 issued Jan. 9, 2018; U.S. Pat. No. 10,612,793 issued Apr. 7, 2020; U.S. Pat. No. 11,193,605 issued Dec. 7, 2021 as well as pending application Ser. No. 17/036,708 filed Sep. 29, 2020.

Priority for this application is hereby claimed under 35 U.S.C. § 119(e) to commonly owned and U.S. Provisional Patent Application No. 63/241,679 which was filed on Sep. 8, 2021 and U.S. Provisional Patent Application No. 63/285,634 which was filed on Dec. 3, 2021 and each of which is incorporated by reference herein in its entirety.

TECHNICAL FIELD

The present application is directed to an improved system for controlling water temperature in a household or commercial water delivery system.

BACKGROUND OF THE INVENTION

In present hot water recirculation systems, in order to prevent the waste of treated water a circulator or pump is installed in the supply line from the hot water tank or in the dedicated return line from the last faucet back to the water heater or tankless heater. Such systems are not completely effective and thus it is an objective of the present invention to provide an improved system for controlling water delivery throughout a household water delivery network that includes bathroom and kitchen sinks, as well as other equipment for dispensing water thereby providing water on demand based on need or selected temperatures to save more water and provide instant hot water comfort.

Current available systems use a valve in the system to sense the temperatures. They usually turn on the pump when temperatures drop to 85 F and shut off at 105 F. Outdoor installed pumps are on at 115 F and off at 125 F. When pumps are installed in the attic or in the garage or outdoors, the environment temperature never drops to the lower ON temp. and therefore, the pumps do not start to provide the desired hot temperature. With the new improved system of the present invention, it does not matter where the pump is installed because this system measures temperature only at the point of use.

SUMMARY OF THE INVENTION

To accomplish the foregoing and other objects of the present invention there is provided a system for controlling water delivery throughout a household water delivery network that includes bathroom and kitchen sinks, as well as other equipment for dispensing water. The system comprises a controller disposed at a site, the temperature of the water of which is to be controlled.

The controller includes a temperature probe for detecting and reacting to the water temperature at the site, a tracking valve for housing the temperature sensor, a pump for circulating water from a water heater/tankless heater to the site, and a wireless communication network (WIFI), that interconnects the controller with the receiver near the pump in order to control hot water that is delivered from the water heater based on sensed temperature at the temperature probe. In accordance with other aspects of the present invention there is provided a tracking bypass valve which is disposed at the site and the temperature probe senses at the bypass valve. The sensor has a low voltage supply from the controller which varies the current or voltage in the power supply. The controller interprets these variations as specific temperature changes. At predetermined temperatures, the controller transmits signals using WIFI wireless networking technology to a smart plug (receiver) to turn the pump on or off.

In accordance with one embodiment of the present invention there is provided a water delivery system that is comprised of: hot and cold water lines that are for feeding hot and cold water to respective hot and cold water fixtures; said hot water line including a hot water outlet pipe for receiving hot water from a hot water source; a bypass valve that is coupled to the hot water fixture from the hot water line; a controller that is disposed at an adjacent site to the bypass valve for monitoring the temperature of the water at the bypass valve which is to be controlled; a temperature probe coupled to the controller for detecting the water temperature at the site; a pump for pumping water from the hot water outlet pipe to the hot water fixture in order to circulate water from the hot water source to the site, and a wireless communication network that interconnects the controller with the pump in order to control hot water delivered from the hot water source based on sensed temperature at the temperature probe.

In accordance with other aspects of the present invention including a receiver that is connected to the pump and that is responsive sensed temperature from the temperature probe in order to control the pump; including a bypass line that couples from the bypass valve to the cold water line; including a check valve constructed and arranged in the bypass line, the check valve positioned so as to selectively direct the hot water from the water pump to the cold water line; wherein the temperature probe senses the temperature at the bypass valve; including a check valve disposed in either the bypass line or the bypass valve; including a tee that has a pair of through ports between the cold water line and the fixture and a side port that connects with the bypass line, and the bypass valve has a pair of through ports between the hot water line and the fixture, a first side port coupled with the bypass line and a second side port for receiving the temperature probe.

In accordance with still another embodiment of the present invention there is provided a system for controlling water delivery throughout a household water delivery network that includes bathroom and kitchen sinks, as well as other equipment for dispensing water, said system comprising: a controller disposed at a site, the temperature of the water of which is to be controlled; said controller including a temperature probe for detecting the water temperature at the site; a pump for circulating water from a water heater to the site; and a wireless communication network that interconnects the controller with the pump in order to control hot water delivered from the water heater based on sensed temperature at the temperature probe.

In accordance with other aspects of the present invention including a bypass valve is disposed at the site and the temperature probe senses at the bypass valve; including a receiver for receiving a temperature signal from the temperature probe for controlling the pump via the wireless communication network; including a bypass line that couples from the bypass valve to the cold water line; and including a check valve constructed and arranged in the bypass line, the check valve positioned so as to selectively direct the hot water from the water pump to the cold watery line.

In accordance with still a further embodiment of the present invention there is provided a process for controlling the water temperature of a water delivery system that includes a pump, either via a wifi hub or a system APP and including the steps of: when the water delivery system is first powered up, or early each morning, or once a week the system checks and verifies a cold water temperature at a point of use; after verifying the cold water temperature, running the pump for a run period; checking, during the run period, the temperature to determine the time required to raise the temperature from the cold water temperature to a preset "off" temperature setting at the point of use; after determining the time required to raise the temperature from the cold water temperature to a preset "off" temperature setting, signaling to stop running the pump; after the pump is stopped, determining the temperature of the water to establish the time required to cool the water to a preset "on" temperature; repeating the aforementioned steps to establish a full cycle time for a system that is up and running; at the conclusion of each cycle the control establishes were in the cycle the water temperature is; and when the temperature drops to the "on" temperature, start a new up and running cycle.

In accordance with another embodiment of the present invention there is provided a recirculation valve for use with a water heater in a system that includes hot and cold water fixtures and a cold water supply, said recirculation valve comprising:
- a valve body having multiple connection in the form of a tee structure that has an internal chamber;
- a thermostatic element that is at least partially disposed in the internal chamber of the valve body;
- said thermostatic element including a support base constructed and arranged within the valve body, and a thermal actuation member that is responsive to water temperature within the valve body;
- said thermal actuation member constructed and arranged to have a retracted position in which the thermal actuation member is retracted into the support base, and an extended position in which the thermal actuation body extends longitudinally away from the support base;
- a cap piece that engages with the thermal actuation piston;
- an end adjustment ring that engages with the valve body and that includes a center hole;
- said adjustment ring adapted for adjustment by the cap piece either opening or closing against the hole in the adjustment ring in order to maintain a predetermined temperature.

In accordance with other aspects of the present invention: further including a spring that is disposed between a support ring of the thermal actuation piston and the adjustment ring; wherein the spring is a coil spring that extends about the cap piece; including an o-ring and the cap piece is pushed by the thermal actuation piston in order to seal against the o-ring; wherein one end of the coil spring rests against adjustment ring and an opposite end of the coil spring rests against the support ring of the thermal actuation piston wherein the support ring rests against an internal surface edge in the valve body; and wherein the adjustment ring is adjusted by rotation to change the distance to the valve body.

BRIEF DESCRIPTION OF THE DRAWINGS

It should be understood that the drawings are provided for the purpose of illustration only and are not intended to define the limits of the disclosure. The foregoing and other objects and advantages of the embodiments described herein will become apparent with reference to the following detailed description when taken in conjunction with the accompanying drawings in which:

FIG. 3 show the water recirculation within a household for a dedicated return line;

DETAILED DESCRIPTION

This invention is for a novel recirculation system for dedicated return line installations and one pipe systems. Refer to the drawings including FIGS. 1-3. As indicated, the system includes a controller T disposed at a site, the temperature of the water of which is to be controlled. The controller T includes a temperature probe P for detecting the water temperature at the site, a pump U for circulating water from a water heater W to the site, and a wireless communication network that interconnects the controller T with the pump U in order to control hot water delivered from the water heater W based on sensed temperature at the temperature probe P.

The controller T connects to the tracking by-pass valve V which houses the temperature probe P for detecting the water temperature at the site, a receiver or Smart plug to receive a signal from the controller, a pump U that plugs into the receiver for circulating water from a water heater W to the site, and a wireless communication network to execute demand for hot water temperature in degrees based on the controller and APP program.

In one embodiment the pump U uses a built in valve that turns on the pump if the temperature at the sink drops below 85 F or 90 F. The water that turned lukewarm in the hot pipe because no one used water for a while activates the pump at say 85 F and turns off when the following water arrives at the sink with 105 F water.

Outdoor pump systems may be set to 115 F-125 F. Instead of dumping the water while waiting, we transfer the lukewarm water by means of a by-pass valve X under the sink into the cold line C. The drawings illustrate both the cold lines C and the hot lines H. Instead of using a valve in the pump, one can use a thermostatic by-pass valve to do the same. When the pump is installed in the garage or attic or outside, the ambient temperature may never drop to the above settings to start the pump. The concept of the present invention is to measure the temperature under the sink in a conditioned room. A controller (board) T keeps sensing the temperature continually or say every minute, 2 minutes, or 5 minutes. The controller T is preferably battery operated. The battery operated controller uses power as it does this. However, the measuring of temperature does not draw a lot of power. The sending of the command to turn on the pump does drain the battery. The pump probably turns on maybe 4 times an hour. When the controller measure the cut off temp of 105 or 125 for outdoor, the pump shuts off. By measuring the temperature inside, we are not affected by hot attic temperatures, or garage temperatures of 110 F, for example. Outdoor temperatures can be above the 115 F temperature and the pump does not turn on even when someone takes a shower and wants hot water.

Figure 1:
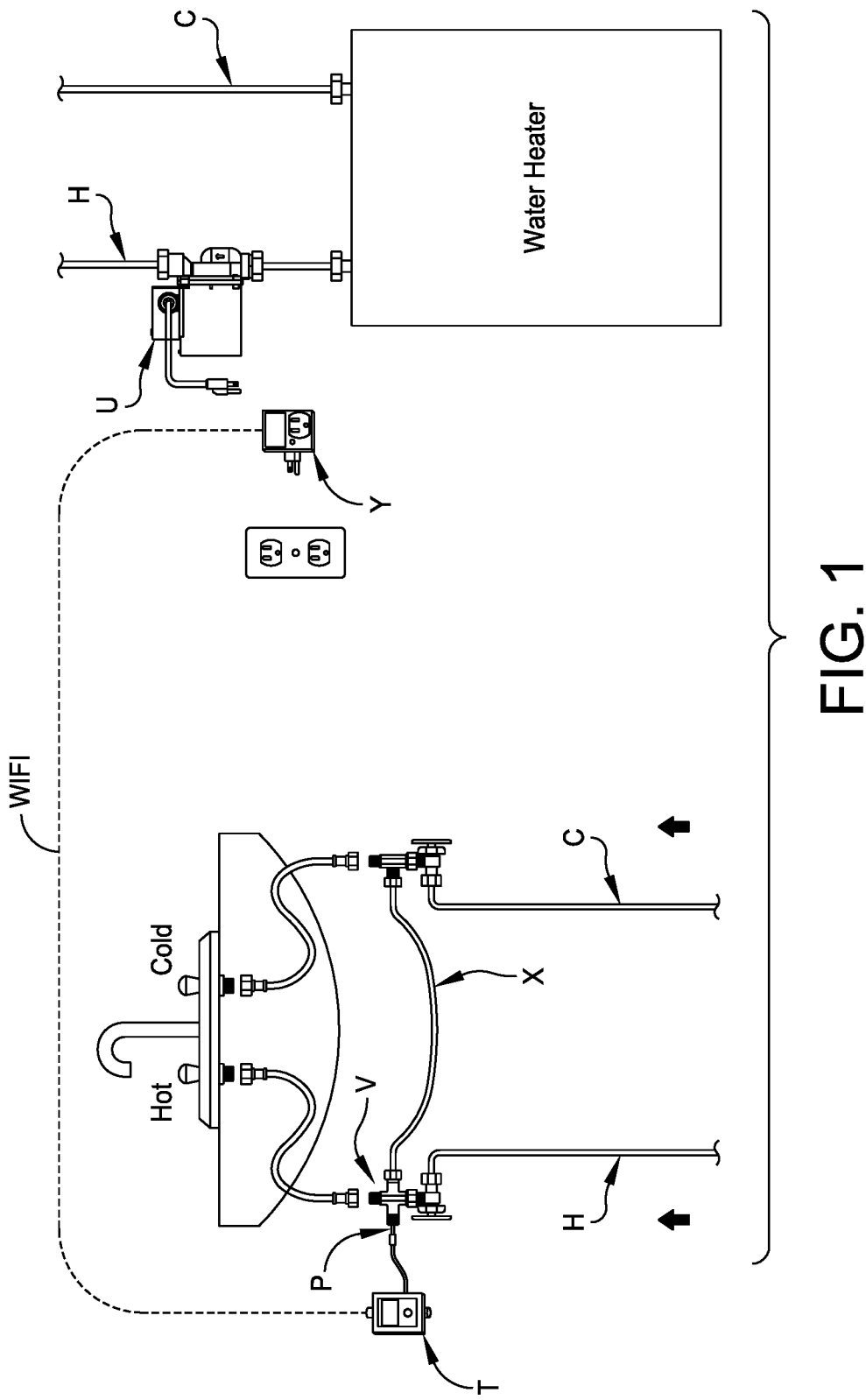
FIG. 1 is a diagram of the water recirculation system for a single pipe construction.
Figure 2:
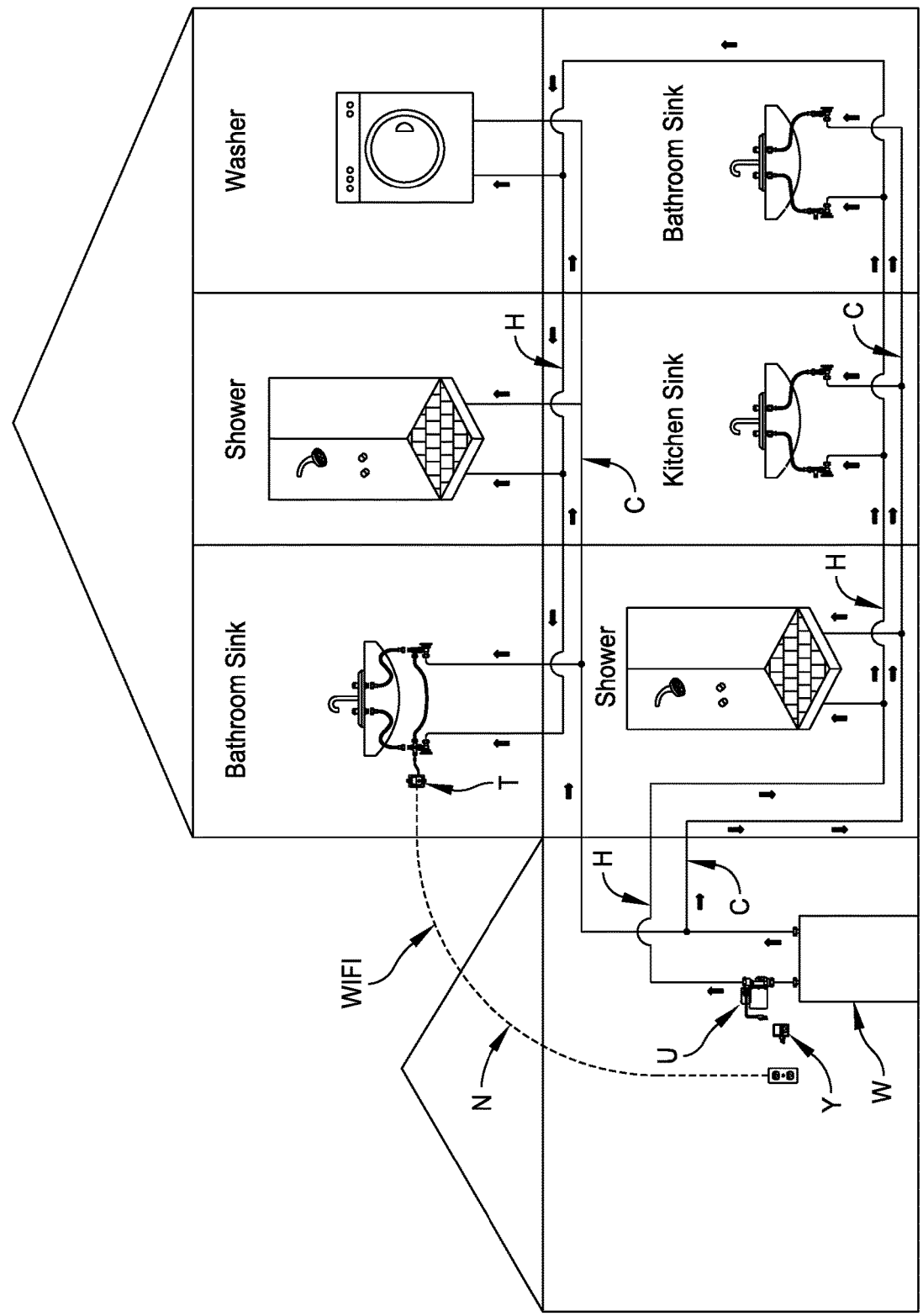
FIG. 2 show the water recirculation within a household for a single system.
Figure 4B:
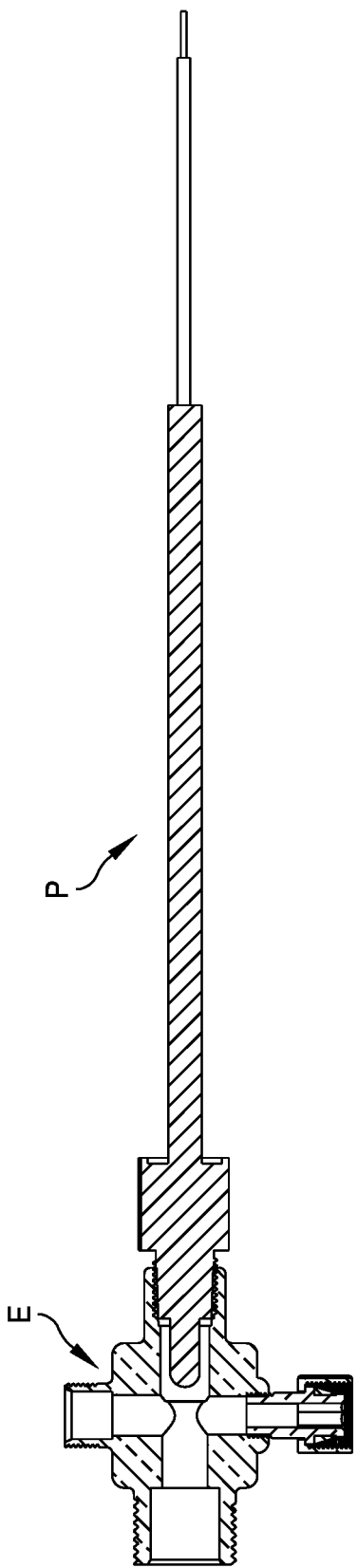
FIG. 4B is a cross-sectional view taken along line 4B-4B of FIG. 4A.
Figure 4C:
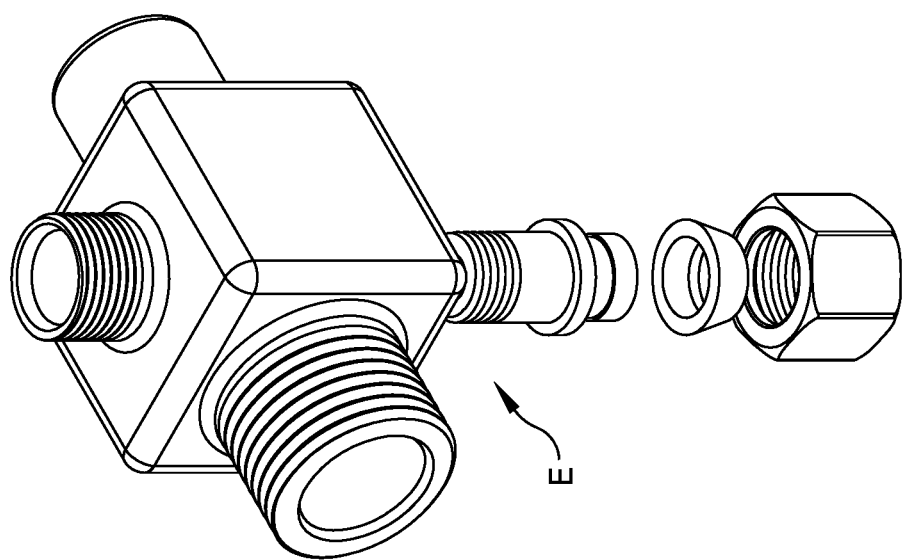
FIG. 4C is a perspective view of the system tee.
Figure 4E:
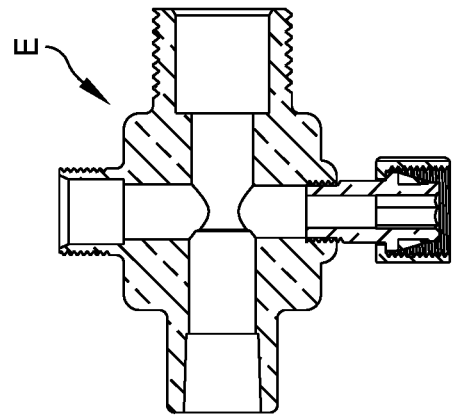
FIG. 4A is a perspective view illustrating the tee and temperature probe.
FIG. 4D is a front view of the system tee.
FIG. 4 E is a cross-sectional view taken along line 4E-4E of FIG. 4D.
Figure 4D:
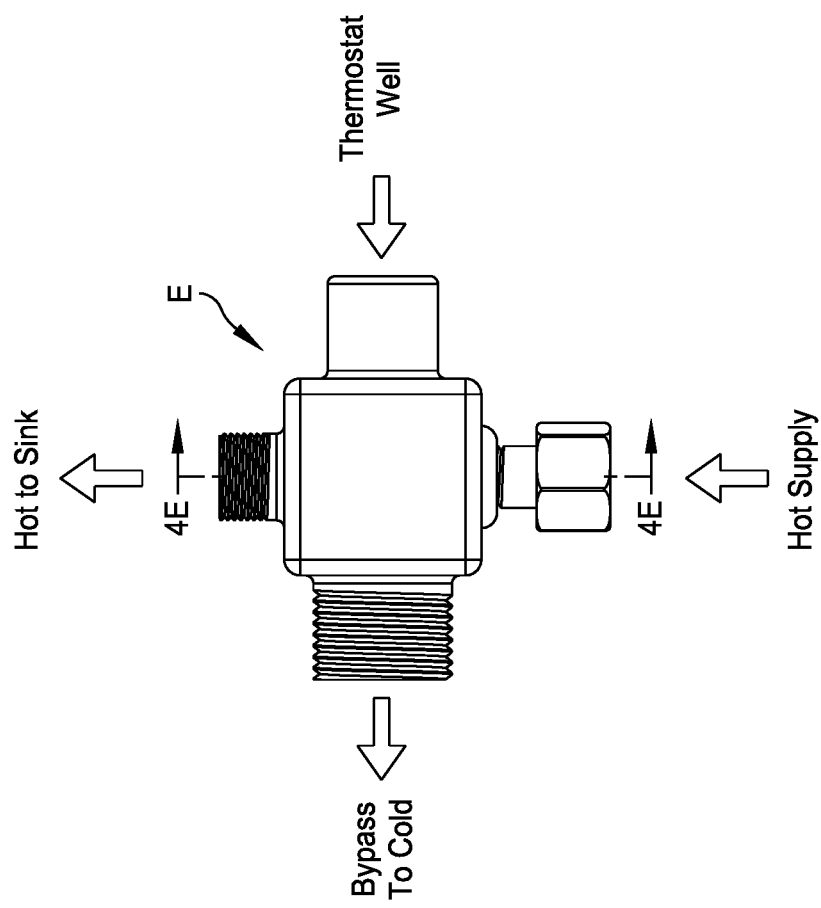

Thus, in accordance with the present invention the problem of various conditions as mentioned above is overcome by measuring the temperature at the particular site, send a signal via the WIFI network to the receiver Y where the pump U is plugged in. Refer to FIGS. 1-3. Using WIFI is important in that electricity is typically not available in a sink area. Part of the system of the present invention is to have an APP where the homeowner can schedule when he wants hot water with a timer or make it ON Demand where the user calls for hot water on the phone. In accordance with the present invention, the controller logic is designed to use little power, so that the battery can last at least one year. By not running the pump during multiple hour segments, but on the APP with exact input at what temperature one wants to turn on the pump, one can have lower electric or heater bills for the pump, and also gas bills to fire the tankless heaters or hot water tanks.

The receiver Y receives signals from the controller T to operate the pump U. This control is such that the pump turn on and off at certain controlled temperatures. The receiver Y is connected through a WIFI network; controlled from the controller T. The use of an APP enables extensive control of operation of the pump U on any desired basis. Refer to, for example, FIG. 2 that illustrates by a dotted line at N the WIFI network that transfers control via the controller to the receiver for controlling operation of the pump U.

In FIG. 1 the bypass line X is illustrated connecting between the tee E and the valve. A check valve Z may be disposed in the bypass line, or at the valve itself. In order to keep cold water from crossing over to the hot water faucet, a check valve Z is preferably included in the bypass line. This stops the flow of cold water to the hot water faucet. FIG. 4A-4D illustrate an embodiment of the temperature probe or sensor used in the system.

The controller includes a temperature probe for detecting and reacting to the water temperature at the site, a tracking valve for housing the temperature sensor, a pump for circulating water from a water heater/tankless heater to the site, and a wireless communication network (WIFI), that interconnects the controller with the receiver near the pump in order to control hot water that is delivered from the water heater based on sensed temperature at the temperature probe. In accordance with other aspects of the present invention there is provided a tracking bypass valve which is disposed at the site and the temperature probe senses at the bypass valve. The sensor has a low voltage supply from the controller which varies the current or voltage in the power supply. The controller interprets these variations as specific temperature changes. At predetermined temperatures, the controller transmits signals using WIFI wireless networking technology to a smart plug (receiver) to turn the pump on or off.

When the pump moves the hot water from the hot water heater to the point of use, cooling hot water in the hot water supply line moves out of the hot water supply line by means of the Aqua-Tracker by-pass valve which connects the hot water supply line to the cold-water supply line at the point of use. The cooling hot water is then returned to the hot water heater through the cold water supply line. A check valve Z in the Aqua-Tracker bypass valve V only allows water to flow from the hot water supply to the cold-water supply. Hot water temperatures are hereby maintained between a minimum and a maximum temperature or specific temperature.

Using WIFI is important in that electricity is usually not available at the sink. Part of the system of the present invention is to have an APP where the homeowner can schedule when he or she wants hot water with a timer on the APP or make it ON Call where the user calls for hot water on the phone or on schedule.

In accordance with the present invention, the controller logic is designed to use little power, so that the battery can last 12 to 16 month. By not running the pump and the heater during multiple hour segments, but on the APP with exact input at what temperature one wants to turn on the pump, one can have lower electric bills for the pump, and also lower gas bills to fire the tankless heaters or hot water tank.

System Capability

The system works with Hubs—Echo Dot (Alexa/Amazon) Home Pod (Siri/Apple) Nest (Google) etc. or hub less. It may operate for a few hours a few times a day. It includes an App that is hub and hub less and smart plug compatible. App set up is an option or ON DEMAND option that defines when it operates.

Schedules can be different for every day of the week or user can set up any start or stop by using the App or hub. The end user can start the kit even during times that are not part of the routine with the App or hub, however, they will have to stop it with the App or hub also. If they do not stop it, the kit will continue to operate until the end of the next cycle in the routine.

The system and algorithm can operate continuously, hub or hub less if the App and smart plug are compatible with each other and/or with the hub if one is used.

ON DEMAND (ON CALL™) End user calls for hot water ON DEMAND. (Currently the hubs or routines have the ability to have the end user start and then stop the kit with the App or hub. The Controller electronics have a switch for ON CALL or Standard operation. When the switch is set to ON CALL, the electronics know not to restart the kit when the temperatures drop. Standard operation is 24/7 application. The battery-operated controller is designed to last 12-16 month without battery change.

In accordance with the present invention, particularly as presented in FIGS. 1-4, one feature is that measuring the run time of the pump to get hot water from the heater to the point of use cuts the run time of the pump by about 93%, therefore providing additional energy savings. The length of the hot pipe is different in every home or business. By stopping the pump earlier when it is calculated, when the hot water arrives at the fixture, there will be less lukewarm water in the cold line. The user will get less warm water when turning on the cold faucet which has been a drawback in past hot water recirculation systems.

In accordance with another embodiment of the present invention, there is provided a recirculation valve for use with a tankless water heater. This valve is not connected with the Aqua-Tracker. It is a by-pass valve that maintains 93 F at the faucet when the pump is running. The pump can be used with a built-in timer or separate timer or it can be used with the smart controller. The controller is not like other devices because, in accordance with the present invention, one can program run and end time and multiple cycles. In accordance with the present invention, we precisely control temperature and the length of time it takes to get water to the point of use. Thus, more energy savings and lower cost. It is a finely tuned machine with an APP.

The ODR2 valve is used with a pump with built-in or no timer, external timer or APP to schedule run time. Using the controller battery to turn on the pump uses too much battery power. Instead we use an RF signal to turn the pump on/off for scheduled programs.

FIGS. 5-8 illustrate a further important feature of the present invention in the form of an adjustable valve that enables the easy adjustment of the temperature setpoint.

Figure 5:
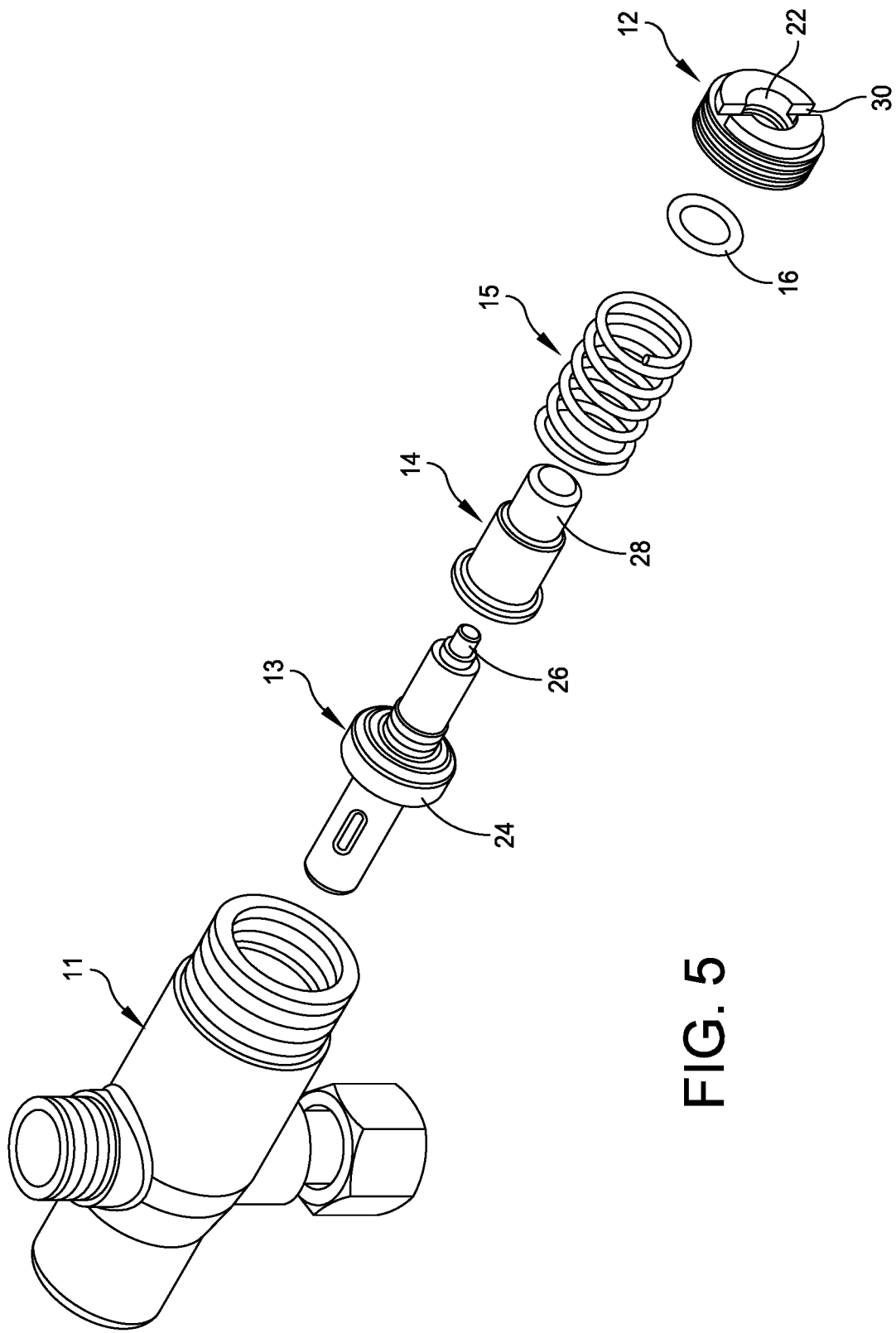
FIG. 5 is a perspective view illustrating the components that comprise the adjustable valve.
Figure 6:
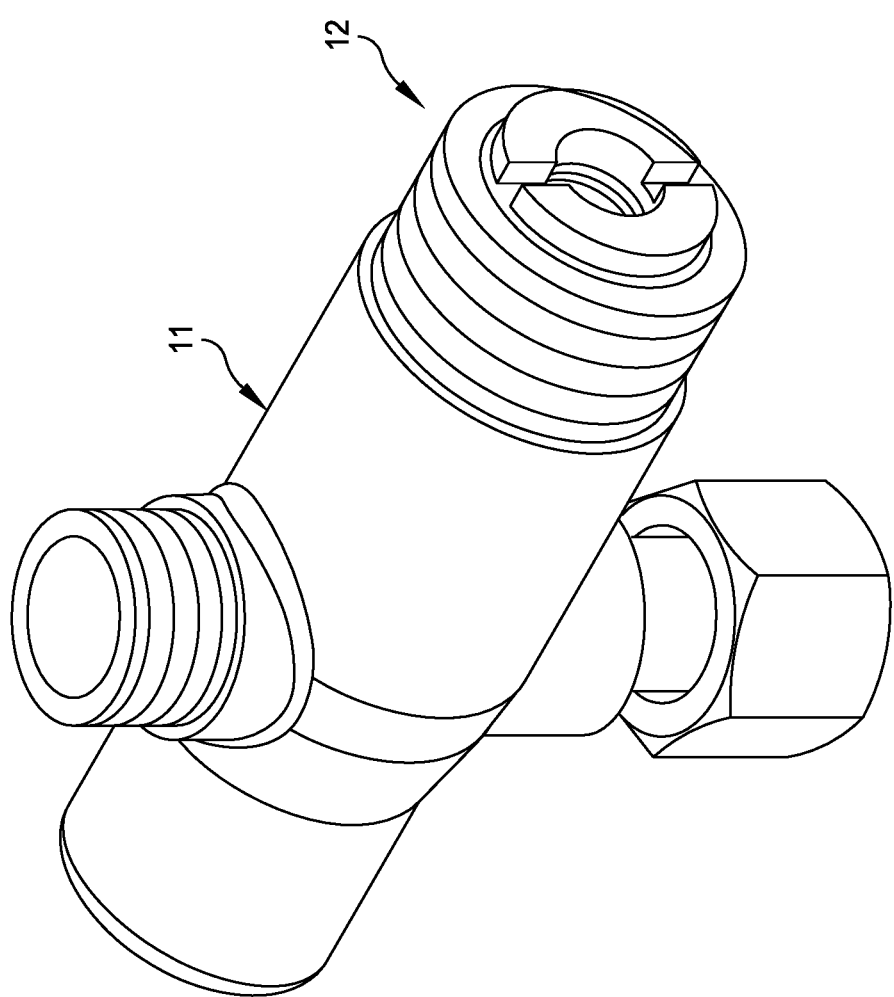
FIG. 6. is a perspective view of the assembled valve.
Figure 7:
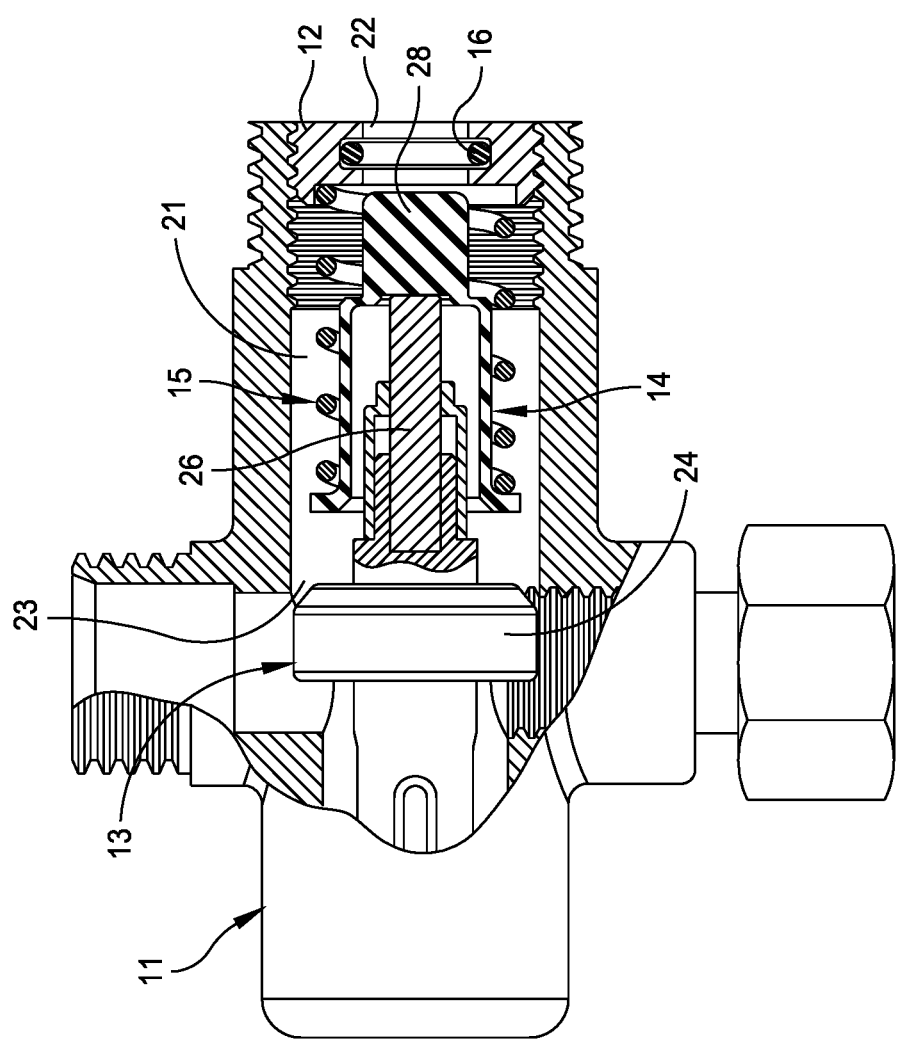
FIG. 7 is a partial cross-sectional view illustrating the components as received with the valve body and in an open position.
Figure 8:
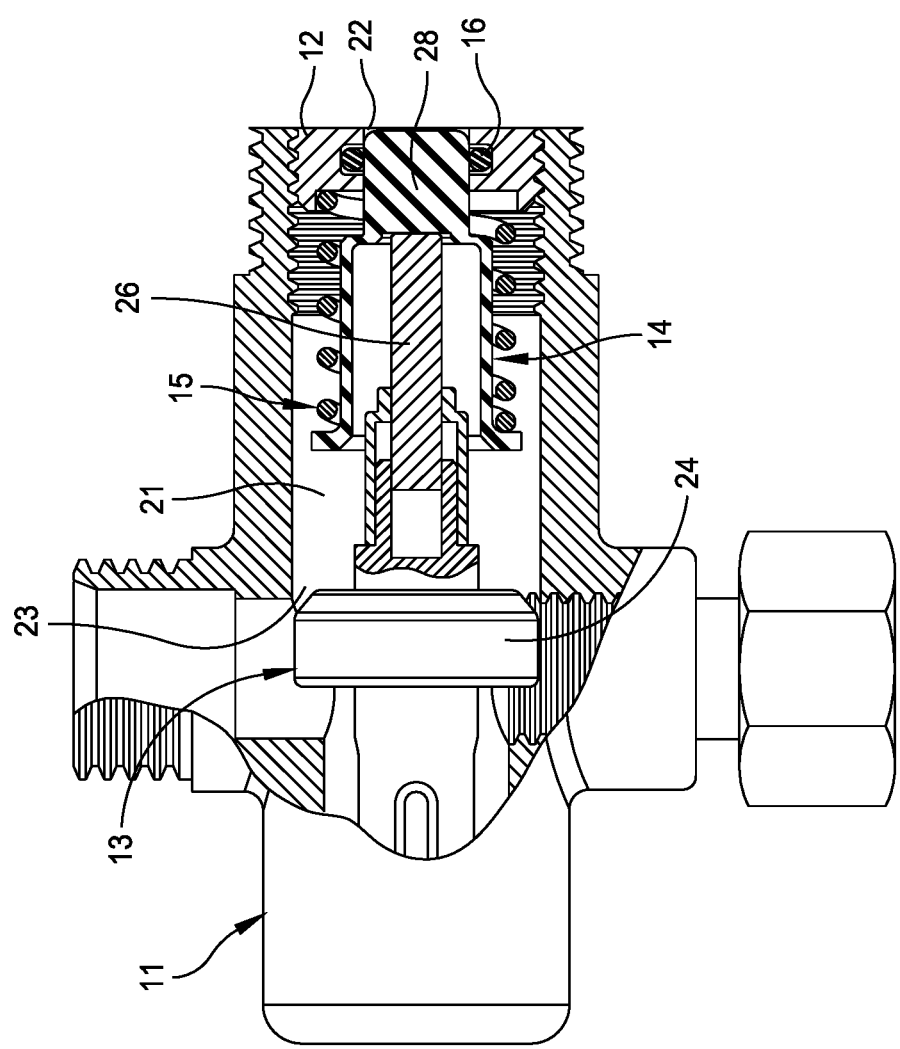
FIG. 8 is a partial cross-sectional view similar to that shown in FIG. 7 but with the valve in a closed position.

FIG. 5 is a perspective view illustrating the components that comprise the adjustable valve. FIG. 6. is a perspective view of the assembled valve. FIG. 7 is a partial cross-sectional view illustrating the components as received with the valve body and in an open position. FIG. 8 is a partial cross-sectional view similar to that shown in FIG. 7 but with the valve in a closed position.

FIG. 5 is a perspective view that is helpful in illustrating all of the components that comprise the adjustable valve. FIGS. 7 and 8 are helpful in showing the final assembled position. In FIG. 7 the valve is in an open position while in FIG. 8 the valve is in a closed position.

The valve construction is comprised of a valve body 11 that has an internal chamber 21, and an adjustment ring 12. The thermostatic element 13 is to be disposed within the valve body and is comprised of an annular support base 24 and a thermal actuation piston 26. The valve is further comprised of a cap piece 14, coil spring 15, and O-ring 16.

The adjustment ring 12 is embedded with the valve body and can be rotated in opposite directions depending upon the temperature setpoint of which the valve is to be controlled. For this purpose, the adjustment ring 12 may have an outer slot 30. A screwdriver or the like can be inserted into the slot 30 for the purpose of adjusting the position of the ring 12.

Thus, the adjustment ring 12 provides for a calibration of the valve to operate from a specific open/closed starting point based upon temperature. For example, this may be adjusted to provide operating temperature between 93 F and 105 F or any other ranges. The cap 14 is engaged over the piston 26. Thus, the cap 14 is pushed by the piston 26 to seal against the O-ring 16. Refer to FIG. 8 wherein the cap piece post 28 extends through the adjustment ring center hole 22; urged against the O-ring 16.

The cap piece 14 thus opens and closes the center hole 22 of the adjustment ring 12 in order to maintain the temperature within the set range. The support base 24 of the thermostatic element 13 is illustrated as having a gap 23 between the support base 24 and the valve body 11. Refer in particular to FIGS. 7 and 8. The mechanism is maintained in place by means of the biasing coil spring 15.

The spring 15 is thus disposed between the cap piece 14 of the thermal actuation piston 26 and the adjustment ring 12. The spring is preferably a coil spring that extends about the cap piece 14. The O-ring and the cap piece are pushed by the thermal actuation piston in order to seal against the O-ring. One end of the coil spring rests against adjustment ring 12 and an opposite end of the coil spring rests against the cap piece 14. The adjustment ring 12 is adjusted by rotation to change the relative distance to the valve body.

Reference is now made to a table that sets forth the various components and associated reference numbers.

| Valve components | Reference Number |
|---|---|
| Pump | U |
| Controller | T |
| Receiver | Y |
| Temperature Probe | P |
| Check Valve | Z |
| Water Source (Heater) | W |
| Bypass Line | X |
| Bypass Valve | V |
| Cold Water Line | C |
| Hot water Line | H |
| Wifi Network | N |
| Angle Stop | S |
| Tee | E |
| Valve Body | 11 |
| Adjustment Ring | 12 |
| Thermostatic Element | 13 |
| Cap Piece | 14 |
| Coil Spring | 15 |
| O-ring | 16 |
| Internal chamber | 21 |
| Adjustment Ring Center Hole | 22 |
| The gap between the support ring and the valve body | 23 |
| Support Base of Thermostatic Element | 24 |
| Valve Body Edge | 25 |
| Thermal Actuation Piston of the Thermostatic Element | 26 |
| Cap Piece Post | 28 |

Having now described a limited number of embodiments of the present invention, it should now be apparent to those skilled in the art that numerous other embodiments and modifications thereof are contemplated as falling within the scope of the present invention, as defined by the appended claims.

What is claimed is:

1. A recirculation valve for use with a water heater in a system that includes hot and cold water fixtures and a cold water supply, said recirculation valve comprising:
    a valve body having multiple connections in the form of a tee structure that has an internal chamber;
    a thermostatic element that is at least partially disposed in the internal chamber of the valve body;
    said thermostatic element including a support base constructed and arranged within the valve body and a thermal actuation piston that is responsive to water temperature within the valve body;
    said thermal actuation piston constructed and arranged to have a retracted position in which the thermal actuation piston is retracted into the support base, and an extended position in which the thermal actuation piston extends longitudinally away from the support base;
    a cap piece that engages with the thermal actuation piston;
    an end adjustment ring that engages with the valve body and that includes a center hole;
    said adjustment ring adapted for engagement with the cap piece to either open or close the hole in the adjustment ring in order to maintain a predetermined temperature.

2. The recirculation valve of claim 1 further including a spring that is disposed about the cap piece.

3. The recirculation valve of claim 2 wherein the spring is a coil spring.

4. The recirculation valve of claim 3 including an O-ring and the cap piece is pushed by the thermal actuation piston in order to seal against the O-ring.

5. The recirculation valve of claim 4 wherein one end of the coil spring rests against the adjustment ring and an opposite end of the coil spring rests against the cap piece.

6. The recirculation valve of claim 5 wherein a gap is defined between the annular support base and the valve body to enable flow in an open position.

7. The recirculation valve of claim 6 wherein the adjustment ring is adjusted by rotation to change a distance relative to the valve body.

8. The recirculation valve of claim 1 further including a spring that is disposed about the cap piece and has one end that abuts the adjustment ring.

9. The recirculation valve of claim 8 wherein the spring is a coil spring.

10. The recirculation valve of claim 1 including an O-ring that is disposed in the hole of the adjustment ring.

11. The recirculation valve of claim 10 wherein and the cap piece is extended by the thermal actuation piston in order to seal against the O-ring in a closed position of the valve.

12. The recirculation valve of claim 11 wherein and the cap piece is retracted by the thermal actuation piston in order to disengage from the O-ring in an open position of the valve.

* * * * *